May 12, 1959 C. B. LEACH Re. 24,650

CAMSHAFT GALLERY STRUCTURE FOR ENGINES

Original Filed June 30, 1954 2 Sheets-Sheet 1

INVENTOR
Clayton B. Leach
BY R. D. Busch
ATTORNEY

May 12, 1959 C. B. LEACH Re. 24,650

CAMSHAFT GALLERY STRUCTURE FOR ENGINES

Original Filed June 30, 1954 2 Sheets-Sheet 2

INVENTOR
Clayton B. Leach
BY
L. D. Burch
ATTORNEY

United States Patent Office

Re. 24,650
Reissued May 12, 1959

24,650

CAMSHAFT GALLERY STRUCTURE FOR ENGINES

Clayton B. Leach, Pontiac, Mich., assignor to General Motors Corporation, Detroit, Mich., a corporation of Delaware Original No. 2,849,993, dated September 2, 1958, Serial No. 440,346, June 30, 1954. Application for reissue December 15, 1958, Serial No. 780,652

15 Claims. (Cl. 123—41.86)

Matter enclosed in heavy brackets [ ] appears in the original patent but forms no part of this reissue specification; matter printed in italics indicates the additions made by reissue.

This invention relates to engines and has particular relation to V type engines having camshaft gallery means between the obliquely disposed cylinder blocks employed in the engine.

In the engines as heretofore constructed the camshaft gallery, particularly in V type engines, has been a considerable source of expense. Extensive cores have been required for casting the camshaft gallery in the block of the engine and the cover for closing the camshaft gallery and the baffling means employed have required considerable labor in assembling and disassembling an engine in production and service. Also, the camshaft gallery cover has had little purpose other than to serve as a closure member through which the valve operating mechanism employed in the camshaft gallery may be made available for assembly and service.

It is now proposed to form an engine block in which at least the upper and larger part of the camshaft gallery can be cast by the use of green sand and without resort to the use of expensive cores. It is also proposed to construct the block in such manner as to save material in the end walls of the block but in which the end walls will provide sufficient reinforcement between the ends of the banks of cylinders formed in the block. It is also proposed to provide an inexpensive camshaft gallery cover that may be easily manufactured from sheet metal stampings and which may be installed in a position to close the open upper part of the camshaft gallery by employing a pair of bolts extending through the cover between the sides and ends of the cover and into the engine frame. It is also proposed to so construct the camshaft gallery cover that it can be used as a settling chamber for separating and returning to the crankcase of the engine the particles of oil that may be suspended in the vaporous substances that are exhausted from the engine through the interior ventilation system for the engine. It is also proposed to employ the cover in such a way as to cooperate with a baffle forming another part of the interior ventilation system for the engine. The cover and an end wall of the camshaft gallery of the engine are also formed in such a manner that the distributor for the engine can be installed in the engine without passing through the camshaft gallery or the cover therefor. The curvature of the cover and the end walls of the engine also lowers the height of the middle of the engine to provide for the extension of the intake manifold between the engine heads at a lower level. This makes possible a considerable decrease in the overall height of the engine.

These improvements facilitate the manufacture of engines and make it possible to construct a better engine at substantially lower cost.

Figures 1, 1A:
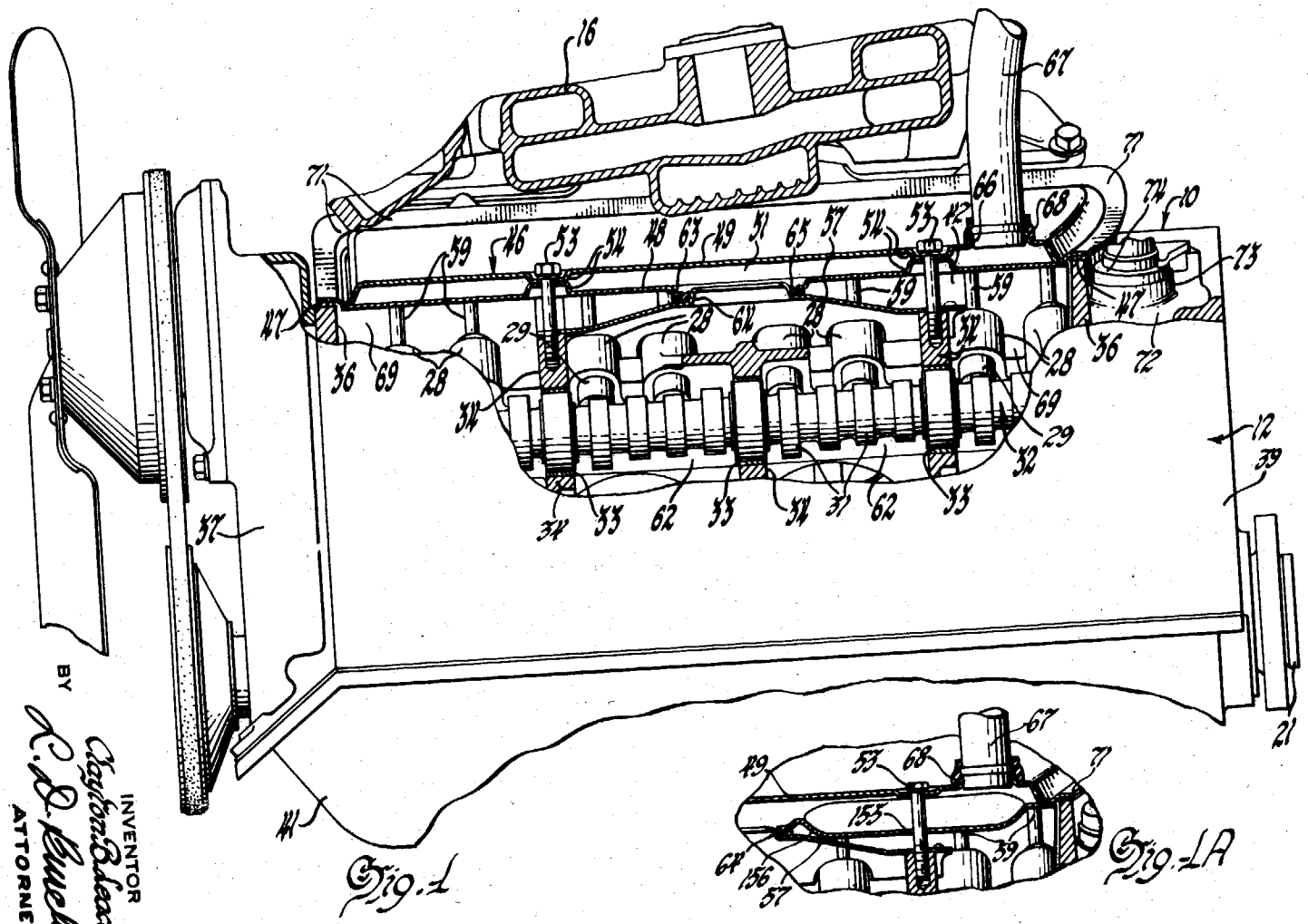
Figure 1 is a side elevational view of an engine with parts thereof broken away and shown in longitudinal section to better illustrate the interior construction of the engine.
Figure 1A is a fragmentary cross sectional view of a part of the structure shown by Figure 1 and relates particularly to the means for returning to the crankcase liquid that is collected in the camshaft gallery cover.
Figure 2:
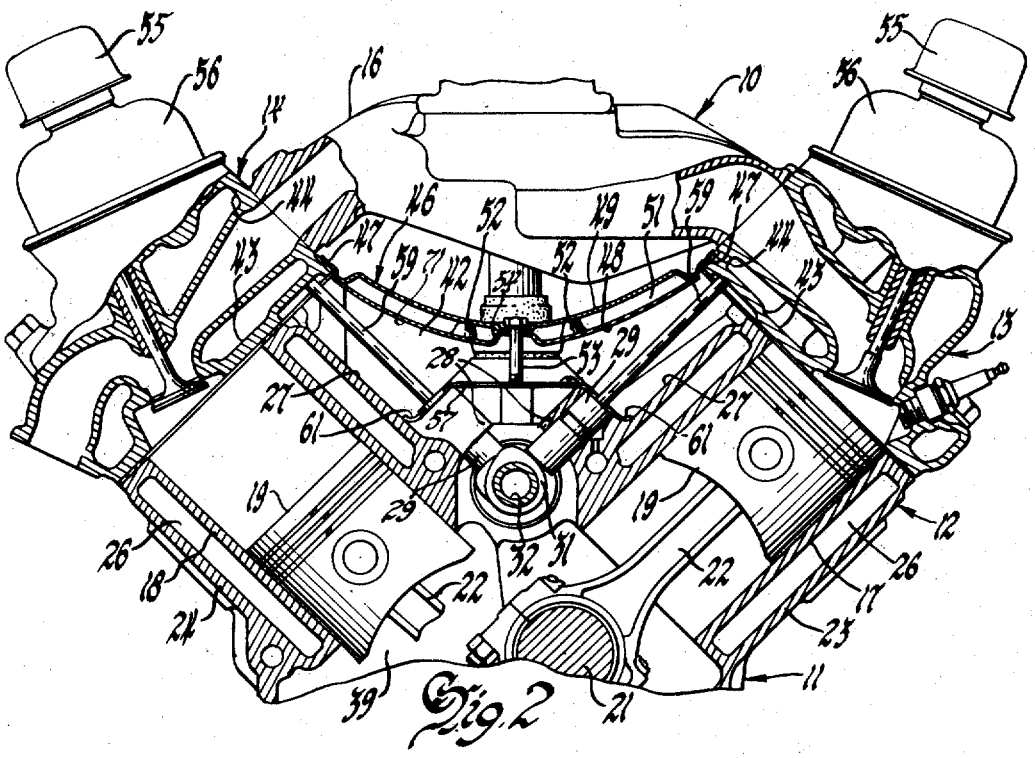
Figure 2 is a fragmentary transverse sectional view of the engine disclosed by Figure 1 as the engine might appear in the plane of line 2—2 on Figure 3.
Figure 3:
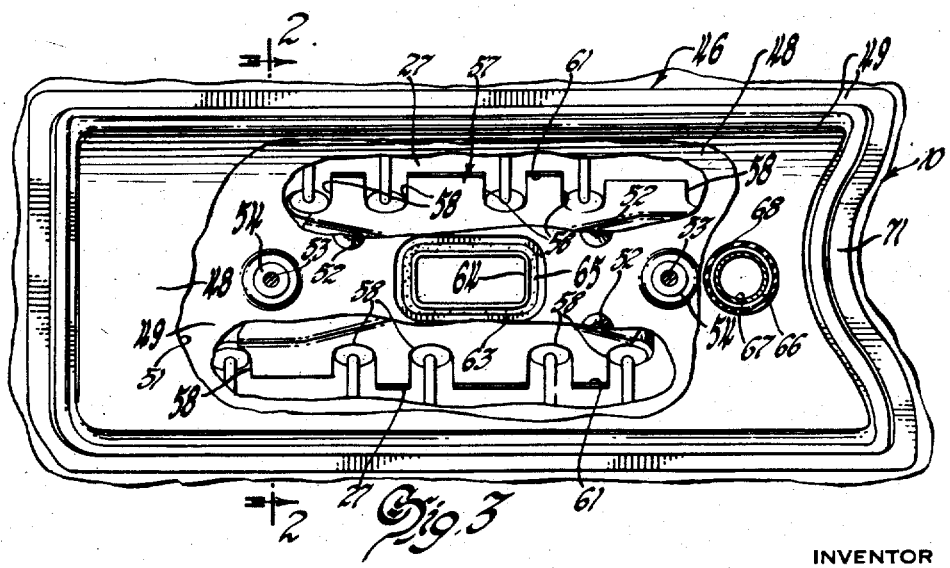
Figure 3 is a fragmentary plan view of the engine showing the camshaft gallery cover and control baffle employed in the engine disclosed by Figures 1 and 2. Parts of the structure of the cover are broken away to better illustrate the edges of the control baffle which forms a part of the interior ventilation system for the engine.

The engine 10 employed in illustrating the invention, is a V type engine having an engine frame 11 composed principally of an engine block 12, a pair of engine heads 13 and 14 and an inlet manifold 16 extending between the heads. The block 12 is formed to provide obliquely disposed rows of cylinders 17 and 18 in which pistons 19 are adapted to reciprocate. The pistons 19 are connected to the crankshaft 21 of the engine by connecting rods 22. The rows of cylinders 17 and 18 are formed in the block 12 in cylinder banks 23 and 24 respectively, each cylinder bank being jacketed to provide cooling liquid cavities 26. The obliquely disposed inner walls 27 of the cylinder banks 23 and 24 are formed to provide inwardly projecting bosses 28 in which valve lifters 29 may be reciprocably mounted. The valve lifters are adapted to be operated by cams 31 on a camshaft 32 which is mounted in bearings 33 formed in transverse walls 34 and end walls 36 extending across the engine block 12 between the cylinder banks 23 and 24. The camshaft 32 is driven from the crankshaft 21 of the engine through the usual timing gears located within the timing gear cover 37. The crankcase 39 of the engine is formed in the block 12 at the inner end of the cylinders 17 and 18 and is closed at the lower extremity thereof by an oil pan 41. A camshaft gallery 42 is formed between the inner walls 27 of the cylinder banks 23 and 24 and at the lower ends of the inner walls 27 and around the camshaft 32. In the present instance the heads 13 and 14 extend inwardly an appreciable distance beyond the upper ends of the inner walls 27 and in such manner that the lower walls 43 of the heads also form parts of the open cavity forming the camshaft gallery 42. The camshaft gallery also is bounded at the ends thereof by the upper ends of the end walls 36 of the block 12. The upper edges of the end walls 36 are curved inwardly to provide arcuate ledges that terminate at the ends thereof in tangential relation to the outer surfaces of the inner side walls 44 of the heads 13 and 14.

The upper open end of the camshaft gallery 42 may be closed by a cover or plate 46, the edges of which are adapted to be compressed against a gasket 47 engaging the upper arcuate edges of the end walls 36 and the lower edges of the side walls 44 of the engine heads. The cover 46 is arcuate transversely of the cover and rectilinear longitudinally of the cover and has a curvature that is somewhat less than the curvature of the upper edges of the end walls 36. The edges of the end walls 36 beyond the curved or arcuate middle parts thereof are adapted to be engaged by the ends of the lower walls 43 of the heads 13 and 14 where the lower walls 43 project beyond the inner walls 27 of the block 12.

The cover 46 may be constructed in any suitable manner as by the formation of a truss structure consisting of inner and outer sheet metal plates 48 and 49. The inner plate 48 may be constructed to form a closure member for closing a depression formed outwardly in the outer member 49. The plate 48 may be made to terminate inwardly of the edges of the plate 49 so that the edges of the plate 48 will remain inside the gasket 47 on which the outer edges of the plate 49 are adapted to be compressed. The edges of the plate 48 may be spot welded or otherwise secured to the plate 49 outwardly of the depression therein. Projections 52 may also be formed in the plate 48 on opposite sides of the middle of the cover 46 and to any desired extent throughout the length of the cover 46 for spacing the plates from one another between the edges thereof. The cover 46 may be resiliently secured upon the gasket 47 engaging the heads 13 and 14 and the end walls 36 by employing any desired number of bolts or other securing means extending along the middle of the cover 46 and between the ends of the edges thereof. In the present instance it has been found satisfactory to employ two of such bolts these being indicated by the numeral 53. The bolts 53 are adapted to extend through openings formed in the plates 48 and 49 at the centers of inwardly formed projections 54 which extend across the space therebetween in such manner that the plates meet one another around the bolt receiving openings. The projections 54 may be spot welded to one another if this is desired.

The bolts 53 are adapted to extend through the openings in the projections 54 and into threaded openings in the upper edges of the outer two of the three transverse walls 34 which extend across the block of the engine between the banks of cylinders 23 and 24. It will be apparent that as the bolts 53 are tightened upon the middle of the cover 46 the curvature of the cover will be increased until the edges of the cover engage the gasket 47 throughout the entire extent of the gasket 47. By properly relating the normal curvature of the cover 46 to the curvature of the edges of the end walls 36 it will be apparent that the edges of the cover may be made to engage the gasket 47 with substantially equal force throughout the entire extent of the gasket 47.

It is proposed to employ the interior of the cover 46 as a separating chamber 51 for separating particles of oil that may be suspended in the air and other vaporous substances within the interior of the engine. In such event the cover 46 may be employed as part of the interior ventilation system of the engine which in the present instance employs intake devices 55 for admitting air to rocker arm covers 56 which are supported on the upper walls of the heads 13 and 14. The air so admitted flows through the rocker arm covers 56 to the opposite ends of the heads, then downwardly through openings extending through the heads and communicating with the opposite ends of the camshaft gallery 42.

In order to insure a proper flow of air within the camshaft gallery and the crankcase of the engine it is proposed to provide a baffle 57 across the upper ends of the outer two of the three transverse walls 34 which extend across the block 12 and upwardly into the lower part of the camshaft gallery 42. The baffle 57 may slope toward the central part of the baffle to provide a relatively rigid structure which will press downwardly at the opposite ends and edges thereof upon the upper ends of the two transverse walls 34 which are engaged by the bolts 53. The bolts 53 may project through openings in the ends of the baffle 57 so as to properly locate the baffle 57 upon the two walls 34. The opposite sides of the baffle 57 are adapted to be provided with notches 58 to provide openings at the outer ends of the valve lifters 29 and through which the push rods 59 for operating the rocker arms may project. The baffle 57 may be bent laterally adjacent the opposite sides thereof so that the baffle will rest upon the outer ends of the bosses 28 around the recesses 57 and will extend between the bosses and into engagement with the inner walls 27 of the block 12. The extreme edges of the baffle 57 may be curved as indicated at 61 so as to engage the walls 27 substantially in tangential relation to the curved edges 61.

It will be apparent that when the central part of the baffle 57 is pressed downwardly the outer edges thereof will relatively tightly engage the upper edges of the two outer walls 34 and the upper ends of the bosses 28 and the sides of the walls 27.

The chamber 51 within the cover 46 may be made to communicate with the compartment 62 between the two outer transverse walls 34 by providing aligned openings in the plate 48 and in the baffle 57. The plate 48 may be flanged around the opening therein as is indicated at 63 for receiving the outwardly projecting central portion 64 of the baffle 57 surrounding the opening in the baffle 57. A gasket 65 made of any resilient oil resistant material may be employed between the flange 63 and the part of the plate or baffle 57 around the projection 64 for sealing the two members and for preventing noise which might result from the engagement of the two members. The baffle 57 is so shaped that when the cover 46 is compressed on the gasket 47 the baffle 57 will be securely and resiliently held against the upper ends of the outer walls 34 and the bosses 28 and the side walls 27.

The chamber 51 may be exhausted by providing an opening at one end thereof within a flange 66 in the plate 49. A draft tube 67 may be projected within the flange 66 and secured thereto by tightening an annular coupling 68 about the tube and the flange.

It will be apparent that the air supplied by the intake devices 55 will flow downwardly in the end compartments 69 between the outer walls 34 and the end walls 36, will flow toward the central part of the crankcase of the engine below the lower extremities of the two outer walls 34 and upwardly within the compartments 62. From the compartments 62 the vaporous substances including the air supplied by the intake devices 54 will flow outwardly through the baffle 57 and into the chamber 51 within the cover 46. Within the chamber 51 the vaporous substances will spread outwardly from the central opening in the plate 48 where the velocity of the vaporous substances will decrease and any particles of oil that may be suspended therein will collect upon the surfaces of the plates 48 and 49. Gravity will cause the oil on the plates 48 and 49 to flow downwardly along the curved surfaces of the walls and to leak outwardly from between the plates 48 and 49 and into the crankcase of the engine, between the spot welded surfaces adjacent the opposite ends of the plates 48 and 49. After spreading outwardly within the chamber 51 the vaporous substances will be exhausted from the engine through the draft tube 67.

It will be noted that the end wall 36 at the rear end of the engine 10 is inwardly curved to conform to the shape of the curved end 71 of the cover 46. Such curvature of the end wall 36 and the end 71 of the cover 46 provides a ledge 72 at the rear of the engine frame and outwardly beyond the end wall 36 where a boss 73 projects upwardly from the ledge. The boss 73 is adapted to be engaged by a flange 74 on the lower end of the casing for the engine distributor and through which the distributor shaft projects into the block of the engine where it is gear driven from the rear end of the camshaft 32. It will be apparent that the curved rear wall 36 and the curved end 71 of the cover 46 provide room for supporting the distributor casing upon the boss 73 and without extending through the camshaft gallery cover and into the camshaft gallery of the engine between the end walls 36. The fact that the curved end 71 of the cover 46 permits the distributor to be installed without passing through the cover or the camshaft gallery of the engine also makes possible a reduction in the over-all length of the distributor. A part of the distributor above the boss 73 may be of normal length but the part within the engine may be much shorter. This provides a closer coupled and more rigid structure and at the same time reduces the cost of the distributor.

The structure shown by Figure 1A is a modified form of cover in which a depression 156 is formed in the inner wall or plate 48 to provide a sump for collecting oil that may settle within the chamber 51 of the cover. The oil so collected may return to the camshaft gallery through a slot 155 formed at one side of the opening through which the bolt 53 at this end of the cover extends. This makes is unnecessary to rely on the space between the places where the edges of the plates 48 and 49 may be spot welded for returning the oil to the interior of the engine. The opening 155 provides a wider and perhaps less restricted return passage for the oil.

I claim:

1. An internal combustion engine comprising an engine frame having obliquely disposed rows of cylinders formed therein and heads for said cylinders, inner walls formed in said frame between said rows of cylinders and on opposite sides of the camshaft gallery for said engine, said heads being formed to provide lower walls engaging the ends of said cylinders and the outer extremities of said inner walls, said frame also being formed to provide end walls for said camshaft gallery and extending between said inner walls, and an arcuate cover for said camshaft gallery, said cover being formed at the ends thereof to engage the inwardly curved upper edges of said end walls and being curved transversely throughout the length thereof to extend between the inner side walls of said head with said inner side walls being substantially tangent to said cover along the opposite edges thereof, said opposite edges of said cover being adapted to overlap and to tightly engage the outer surfaces of said side walls along the inner extremities thereof.

2. An internal combustion engine as defined by claim 1 and in which said lower walls of said head extend inwardly beyond said inner walls and engage the ends of said curved upper edges of said end walls at the opposite extremities thereof.

3. An internal combustion engine comprising an engine frame having a pair of obliquely disposed rows of cylinders formed therein and heads for said cylinders, said frame being formed to provide an open camshaft gallery between said rows of cylinders and having end walls at the opposite ends of said camshaft gallery and extending between said rows of cylinders, said heads being formed to provide obliquely disposed inner side walls disposed in parallel relation throughout the length of said frame, and an arcuate cover extending between said inner walls of said head and engaging the inner curved edges of said end walls, and fastening means between the ends and sides of said cover for clamping said cover in engagement with said inner side walls of said heads and said ends of said frame.

4. An internal combustion engine comprising an engine frame having obliquely disposed rows of cylinders formed therein and heads for said cylinders, said frame being formed to provide end walls extending between said rows of cylinders at the opposite ends of said frame, and a camshaft gallery cover supporting ledge formed on said frame, said ledge being formed along the parallel lower edges of the inner side wall surfaces of said heads and extending across said end walls along arcuate edges of said end walls forming substantially circular arcs which are substantially tangent to said lower edges of said inner side wall surfaces of said heads.

5. An internal combustion engine comprising an engine frame having parallel rows of obliquely disposed cylinders formed therein and heads for said cylinders, a camshaft gallery formed in said frame between said rows of cylinders and said engine heads, and a cover for said camshaft gallery, said cover being curved transversely of said engine and having the opposite edges thereof abutting the inner side walls of said heads and the opposite ends thereof engaging the upper curved edges of the end walls of said frame which extend between said rows of cylinders and said heads at the ends of said camshaft gallery.

6. An internal combustion engine comprising an engine frame having a pair of obliquely disposed rows of cylinders formed therein and heads for said cylinders, a camshaft gallery formed between said rows of cylinders and between the ends of said frame, a sheet metal cover for said camshaft gallery and adapted to engage said frame around the edges of said cover, a closure member within said cover and spaced from said cover to provide a settling chamber within said cover, means connecting said settling chamber to the interior of said engine, and means connecting said settling chamber to the atmosphere.

7. An internal combustion engine comprising an engine frame having a pair of obliquely disposed rows of cylinders formed therein and heads for said cylinders, a pair of transverse walls formed in said frame and dividing the interior of said engine into a central compartment and two end compartments, a hollow camshaft gallery cover for said engine for closing the camshaft gallery of said engine, means connecting the hollow interior of said camshaft gallery cover to said central compartment, and means for exhausting said cover interior to the atmosphere.

8. A camshaft gallery cover for an engine having obliquely disposed rows of cylinders formed therein and a camshaft gallery and comprising an elongated plate adapted to extend substantially throughout the length of said engine for closing said camshaft gallery, said plate being of arcuate configuration transversely of said plate and of linear configuration throughout the length thereof and having edges formed to fit gasket engaging ledges surrounding an opening in the upper part of said engine and leading to said camshaft gallery, and means for securing said cover to said engine frame, said means being formed along the middle of said plate and between the opposite ends and edges of said plate and in which said plate comprises two sheet metal members secured to one another around the edges of one of said members and forming a hollow settling chamber between said edges and being formed to provide passages communicating with said settling chamber and extending through each of said members.

9. A camshaft gallery cover comprising a pair of spaced sheet metal members secured to one another along the edges of one of said members to provide a settling chamber within said cover, an opening formed in the inner one of said members and between the sides and ends thereof, and a baffle associated with said inner member and having an opening therein adapted to communicate with said opening in said inner member and having recesses extending within opposite sides thereof and adapted to fit around valve lifter supporting bosses in the camshaft gallery of said engine for controlling the circulation of vaporous substances within the camshaft gallery and crankcase of said engine.

10. A camshaft gallery cover comprising a pair of sheet metal plates adapted to be spot welded together around the edges of one of said plates and being depressed laterally between said edges to provide a large shallow chamber between said plates, said plates between the sides and edges thereof being depressed toward one another to provide engagement means between said plates and to provide means for spot welding said plates together intermediate the sides and ends thereof, said plates being formed to provide openings through said engagement means for receiving bolts for securing the sides and ends of said cover to ledges formed in the frame of an internal combustion engine and around an opening leading to the camshaft gallery in the interior of said engine.

11. A camshaft gallery cover as defined by claim 10 and in which sections taken through said cover are linear in one direction and arcuate in another.

12. An internal combustion engine comprising an engine frame having a camshaft gallery formed therein, said camshaft gallery being formed at one end of said engine by an end wall of said frame, said end wall being curved inwardly of said camshaft gallery between the opposite ends of said wall and toward the opposite end of said frame, and a cover for said camshaft gallery having a curved end adapted to fit said curved end wall of said frame, the curvature of said end wall and said cover defining a ledge having engine element mounting boss means formed thereon at one end of said engine frame and outwardly beyond said end wall.

13. An internal combustion engine as defined by claim 12 and in which an opening is formed in said boss means, said opening leading to the interior of said engine and being adapted to receive a shaft for driving said element.

14. An internal combustion engine comprising an engine frame having parallel rows of obliquely disposed cylinders formed therein and heads for said cylinders, a camshaft gallery formed in said frame between said rows of cylinders and said heads, and a cover for said camshaft gallery, said cover being curved transversely of said engine and having the opposite edges thereof engaging and extending along the inner side walls of said heads and the opposite ends thereof engaging the upper edges of the end walls of said frame which extend between said rows of cylinders and said heads and at the ends of said camshaft gallery, said inner side walls of said heads and said opposite edges of said cover being substantially tangent to the part of said cover between said opposite edges, said opposite edges of said cover being adapted to overlap and to tightly engage the outer surfaces of said side walls of said heads.

*15. An internal combustion engine comprising an engine frame having parallel rows of obliquely disposed*

*cylinders formed therein and heads for said cylinders, a camshaft gallery formed in said frame between said rows of cylinders and said heads, and a cover for said camshaft gallery, said cover being depressed transversely of said engine and having the opposite edges thereof engaging and extending upwardly and diverging outwardly along the inner side walls of said heads and the opposite ends thereof engaging the upper edges of the end walls of said frame which extend between said rows of cylinders and said heads and at the ends of said camshaft gallery, said inner side walls of said heads and said opposite edges of said cover being disposed obliquely to the intermediate part of said cover between said opposite edges, said opposite edges of said cover being adapted to overlap and to tightly engage the outer surfaces of said inner side walls of said heads.*

References Cited in the file of this patent or the original patent

UNITED STATES PATENTS

| | | |
|---|---|---|
| 1,293,712 | Church | Feb. 11, 1919 |
| 1,444,279 | Short | Feb. 6, 1923 |
| 1,897,783 | Anibal | Feb. 14, 1933 |
| 1,916,522 | McCuen | July 4, 1933 |
| 2,073,871 | Kliesrath | Mar. 16, 1937 |
| 2,632,340 | Dolza et al. | Mar. 24, 1953 |
| 2,660,987 | Doughty | Dec. 1, 1953 |

FOREIGN PATENTS

| | | |
|---|---|---|
| 277,577 | Germany | Aug. 25, 1914 |